(12) United States Patent
Avetoom et al.

(10) Patent No.: US 11,966,744 B2
(45) Date of Patent: *Apr. 23, 2024

(54) SYSTEM AND METHOD FOR ASYNCHRONOUS DISTRIBUTION OF OPERATIONS THAT REQUIRE SYNCHRONOUS EXECUTION

(71) Applicant: T-Mobile USA, Inc., Bellevue, WA (US)

(72) Inventors: Paul Avetoom, Renton, WA (US); Sadique Farooqui, Mercer Island, WA (US); Nader Riad, Bothell, WA (US); Robert Engelhart, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,225

(22) Filed: Dec. 27, 2022

(65) Prior Publication Data

US 2023/0133744 A1 May 4, 2023

Related U.S. Application Data

(63) Continuation of application No. 17/343,064, filed on Jun. 9, 2021, now Pat. No. 11,544,071, which is a continuation of application No. 16/692,882, filed on Nov. 22, 2019, now Pat. No. 11,048,519.

(51) Int. Cl.
*G06F 9/38* (2018.01)
*G06F 9/30* (2018.01)
*G06F 9/54* (2006.01)
*H04L 67/02* (2022.01)

(52) U.S. Cl.
CPC ........ *G06F 9/3871* (2013.01); *G06F 9/30087* (2013.01); *G06F 9/542* (2013.01); *H04L 67/02* (2013.01)

(58) Field of Classification Search
CPC .... G06F 9/3871; G06F 9/30087; G06F 9/542; G06F 9/541; H04L 67/02; H04L 67/60
See application file for complete search history.

(56) References Cited

U.S. PATENT DOCUMENTS

| | | | |
|---|---|---|---|
| 9,231,858 B1 | 1/2016 | Greifeneder | |
| 9,424,075 B1* | 8/2016 | Halim | G06F 9/5038 |
| 9,894,143 B1* | 2/2018 | Word | H04L 67/10 |

(Continued)

OTHER PUBLICATIONS

Notice of Allowance dated Mar. 2, 2021 for U.S. Appl. No. 16/692,882 (pp. 1-9).

(Continued)

*Primary Examiner* — Michael Won
(74) *Attorney, Agent, or Firm* — Lee & Hayes P.C.

(57) ABSTRACT

A system and method may manage traffic to software applications that ingest operations into an asynchronous queue when those operations are required to execute in a synchronous manner. An identifier may be retrieved from data corresponding to each client operation. A process distribution module may be placed in front of the two incompatible systems/applications to inspect each data payload and intelligently distribute the transactions to each instance based on a well-defined algorithm (e.g., even/odd, last digit, etc.). Synchronous execution may then occur according to a timestamp for each operation.

20 Claims, 4 Drawing Sheets

(56) References Cited

U.S. PATENT DOCUMENTS

| | | | |
|---|---|---|---|
| 10,230,670 B1* | 3/2019 | Cui | H04L 51/23 |
| 10,409,825 B1* | 9/2019 | Gau | G06F 9/546 |
| 11,048,519 B2 | 6/2021 | Avetoom | |
| 11,503,104 B1* | 11/2022 | Thomas | H04L 67/01 |
| 11,544,071 B2 | 1/2023 | Avetoom | |
| 11,556,225 B1* | 1/2023 | Romagnoli | G06F 16/287 |
| 2003/0232616 A1 | 12/2003 | Gidron | |
| 2004/0240655 A1* | 12/2004 | Swick | H04M 3/4931 |
| | | | 379/218.01 |
| 2005/0114538 A1 | 5/2005 | Rose | |
| 2007/0022264 A1 | 1/2007 | Bromling | |
| 2009/0010197 A1* | 1/2009 | Chao | H04H 20/61 |
| | | | 370/312 |
| 2012/0159448 A1 | 6/2012 | Arcese | |
| 2014/0258226 A1 | 9/2014 | Noteboom | |
| 2014/0330896 A1 | 11/2014 | Addala | |
| 2015/0127769 A1* | 5/2015 | Word | H04L 47/564 |
| | | | 709/217 |
| 2015/0172202 A1 | 6/2015 | Zealey | |
| 2016/0337426 A1 | 11/2016 | Shribman | |
| 2017/0075627 A1 | 3/2017 | Pradeep | |
| 2017/0351982 A1* | 12/2017 | Tineo | G06Q 10/0631 |
| 2018/0341523 A1* | 11/2018 | Evenson | G06F 9/5038 |
| 2019/0311054 A1 | 10/2019 | Pundir | |
| 2020/0142757 A1 | 5/2020 | Norris | |
| 2020/0281027 A1 | 9/2020 | Damnjanovic | |
| 2021/0157604 A1 | 5/2021 | Avetoom | |
| 2021/0294611 A1 | 9/2021 | Avetoom | |

OTHER PUBLICATIONS

Office Action (Notice of Allowance and Fees Due (PTOL-85)) dated Aug. 31, 2022 for U.S. Appl. No. 17/343,064 (pp. 1-8).

Office Action (Notice of Allowance and Fees Due (PTOL-85)) dated Sep. 9, 2022 for U.S. Appl. No. 17/343,064 (pp. 1-6).

Office Action dated Nov. 6, 2020 for U.S. Appl. No. 16/692,882 (pp. 1-13).

* cited by examiner

SYSTEM AND METHOD FOR ASYNCHRONOUS DISTRIBUTION OF OPERATIONS THAT REQUIRE SYNCHRONOUS EXECUTION

CROSS-REFERENCE TO RELATED APPLICATIONS

This application is a continuation of and claims priority to U.S. patent application Ser. No. 17/343,064, filed Jun. 9, 2021, which claims priority to U.S. patent application Ser. No. 16/692,882, filed Nov. 22, 2019 (now U.S. Pat. No. 11,048,519) entitled "SYSTEM AND METHOD FOR ASYNCHRONOUS DISTRIBUTION OF OPERATIONS THAT REQUIRE SYNCHRONOUS EXECUTION," the entire contents of which are incorporated herein by reference.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Software applications are often required to perform operations sequentially or "synchronously" such that a first operation and/or its data must be executed and data available before a second operation can be executed. A synchronous operation within a larger process blocks the process until the operation completes. In contrast, an asynchronous operation initiates the operation without waiting for a previous operation to complete. The caller discovers completion by some later operation.

Conflict often occurs in applications that ingest operations into an asynchronous queue, but require synchronous execution. For example, when the application architecture changes during a migration or during normal operation, it is necessary to distribute the distinct subscriber operations/order/traffic to the same application instance so that the asynchronous requests may be performed sequentially. For distributed applications, if the traffic is received at multiple application instances for the same network subscriber, and there is no communication between the two instances, then out of sequence operations/orders/traffic will occur which may cause corruption. This corruption is particularly acute in network-based software applications that frequently perform major upgrades and have individual entity provisioning and order management.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

An identifier may be retrieved from the originating data source (e.g., a customer ID). An intermediary software function may be placed in front of the two incompatible systems/applications to inspect each data payload and intelligently distribute the transactions to each instance based on a well-defined algorithm (e.g., even/odd, last digit, etc.).

A system for asynchronous distribution of operations that require synchronous execution may include a processor and a memory storing instructions. When executed, the instructions may determine a consumer identification for each of a plurality of client operations received from a plurality of client computing systems. The instruction may then approximately evenly distribute each of the client operations among two asynchronous queues based on the consumer identifier for each of the client operations. A first operation of the plurality of client operations within the two asynchronous queues for each of the consumer identifiers may then be executed when each of the plurality of client operations includes a timestamp and the timestamp of the first operation is previous to timestamps of a remainder of the plurality of client operations.

A computer-implemented method for asynchronous distribution of operations that require synchronous execution may first determine a consumer identification for each of a plurality of client operations received from a plurality of client computing systems. Then, the method may approximately evenly distribute each of the client operations among two asynchronous queues. Distribution of the client operations may based on the consumer identifier for each of the client operations (e.g., operations with an odd-numbered consumer identifier may be placed in a first asynchronous queue while operations with an even-numbered consumer identifier may be placed in a second asynchronous queue). The method may then execute a first operation of the plurality of client operations within the two asynchronous queues for each of the consumer identifiers when a timestamp of the first operation is previous to timestamps of a remainder of the plurality of client operations.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
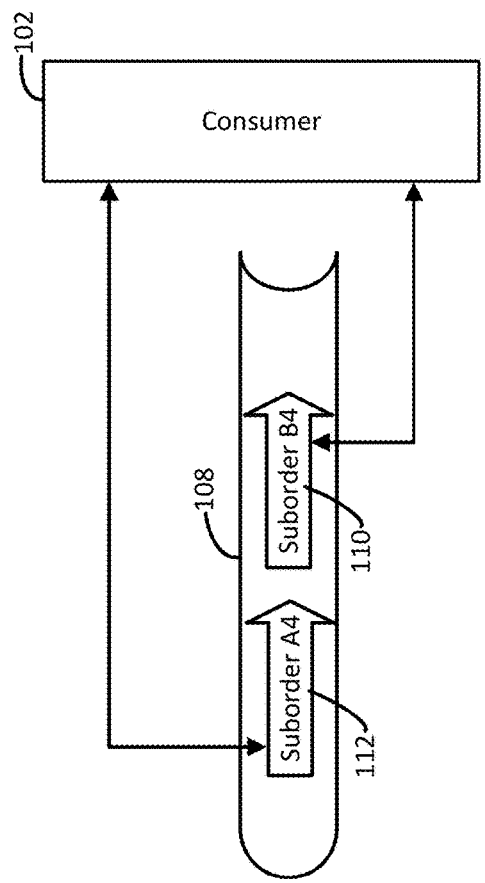
FIG. 1 is an illustration of out of sequence provisioning in accordance with the current disclosure.
Figure 1:
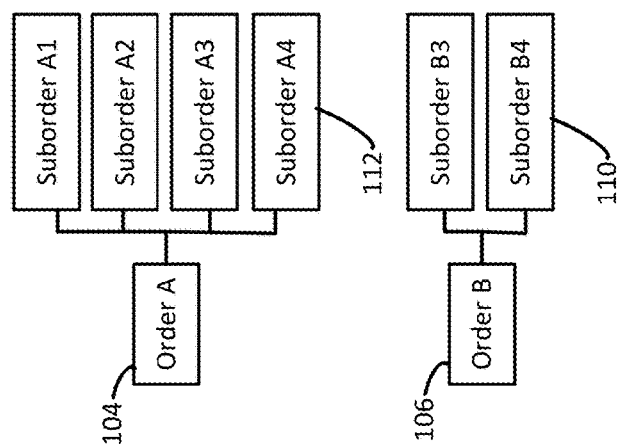

FIG. 1 shows a block diagram of order sequencing within a network-based consumer services system 100. Several consumer computing devices may be subscribed to a network as various "nodes" of that network. One subscribed consumer computing device 102 may request a plurality of services or "orders" from another network computing device. For example, the consumer computing device 102 may request a first order 104 and a second order 106 from another network entity (e.g., an online merchant, a cellular service provider, an internet of things backend, etc.). Each order 104, 106 may include one or more suborders for the requesting nodes. For example, as shown in FIG. 1, order "A" 104 may include a suborder "A" that is designated for four subscribers, 1, 2, 3, and 4. Similarly, order "B" 106 may include a suborder "B" that is designated for two subscribers, 3 and 4. In the example of a cellular service provider, order A 104 may be a request to add voicemail services to an account corresponding to the consumer computing device 102 and order B may be to change the voicemail settings for the service requested in order A 104. Order A 104, with four asynchronous sub-orders, may be received in the network. The request for order B 106 may arrive while order A 104 is still not inserted into a data pipeline 108 for execution. The suborder B for node four 110 may be added to the data pipeline 108 before suborder A for node four 112 (the same node). With the example of a cellular service provider and voicemail, if the system attempts to execute the suborder to change voicemail settings (i.e., suborder 110) before the suborder to add voicemail services (i.e., suborder 112), both orders for node four will fail.

Figure 2:
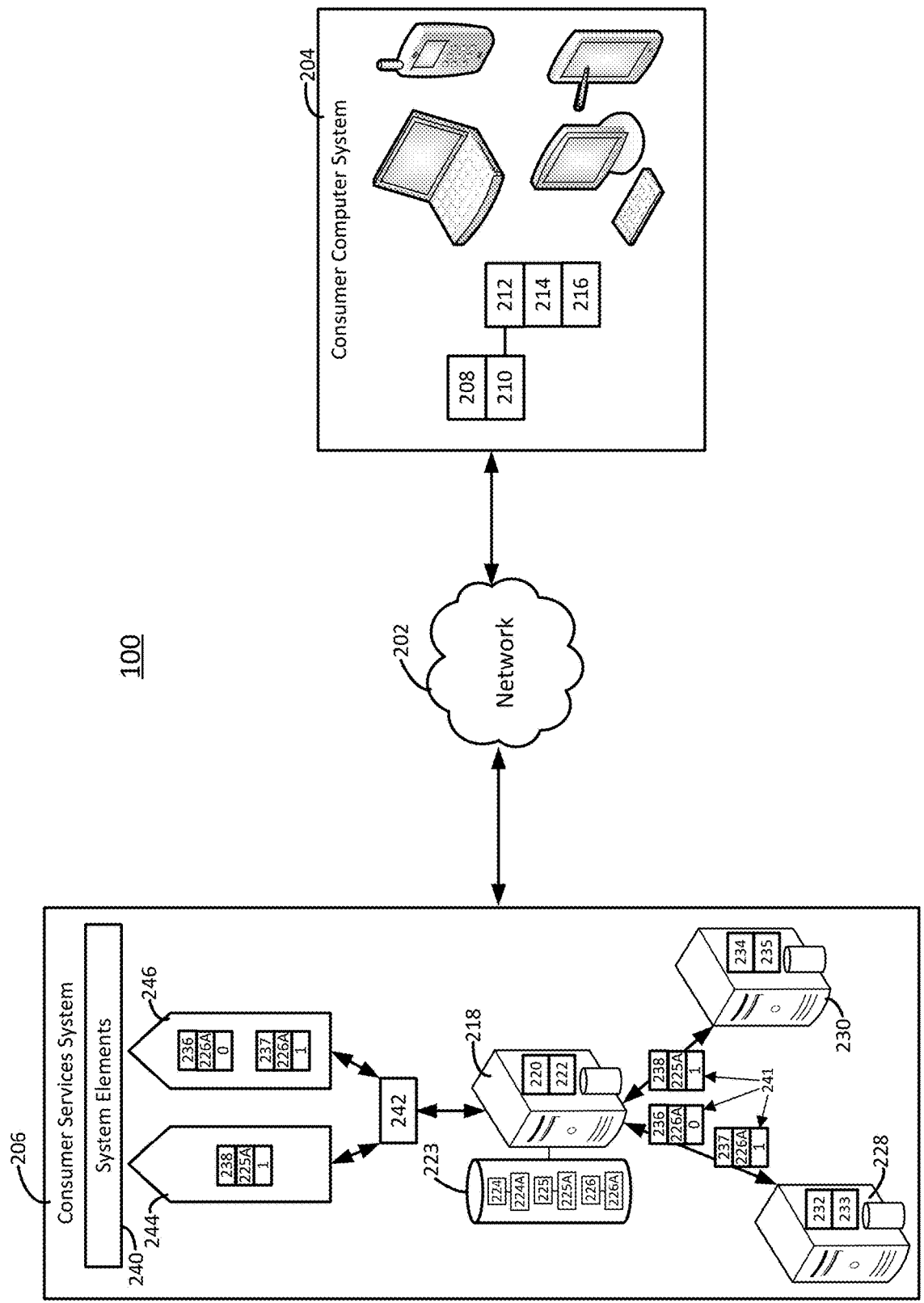
FIG. 2 illustrates an exemplary system for distributing asynchronous orders in accordance with the current disclosure.

FIG. 2 shows a block diagram for another view of the consumer services system 100 for distributing client operations in accordance with the current disclosure. The system 100 may include a computer network 202 that links one or more systems and computer components. In some embodiments, the system 100 may also include a consumer computer system 204, and a consumer services system 206.

The network 202 may be described variously as a communication link, computer network, internet connection, etc. The system 100 may include various software or computer-executable instructions or components stored on tangible memories and specialized hardware components or modules that employ the software and instructions to facilitate distributing asynchronous orders as described herein.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

Networks, such as the network 202, comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A consumer computer system 204 may include a processor 108 and memory 210. The user computing system 204 may include a server, a mobile computing device, a smartphone, a tablet computer, a Wi-Fi-enabled device or other personal computing device capable of wireless or wired communication, a thin client, or other known type of computing device. The memory 208 may include various modules with instructions that, when executed by the processor 210 control the functions of the consumer computer system generally and integrate the consumer computer system 204 into the system 100 in particular. For example, some modules may include an operating system 212, a browser module 214, and a communication module 216. Each of the modules 212, 214, and 216 may facilitate executing remote commands with other nodes of the network 202 (e.g., the consumer services system 206).

The consumer services computer system 206 may include a computing device such as a consumer services server 218 including a processor 220 and memory 222 with instructions to facilitate provisioning operations for multiple processes corresponding to a single consumer account that, if executed out of order, would result in failure of those operations or corruption of the consumer account information. The consumer services system 206 may also include a consumer account repository 223 for storing consumer account data profiles 224, 225, 226 that are managed by the consumer services system 206. Each data profile may include a corresponding consumer identification 224A, 225A, 226A.

The system 206 may also include one or more provisioning clients, e.g., a first provisioning client 228 and a second provisioning client 230. Each client 228, 230 may include a processor 232, 234 and memory 233, 235, respectively, and may send client operations 236, 237, 238 to the consumer services server 218 for in-order execution at the various system elements 240. Each operation 236, 237, 238 may include a consumer identification (e.g., one of 224A, 225A, or 226C) and a sequence number or timestamp 241. The timestamp 241 may indicate when the client operation was requested by the consumer computer system 204.

A process distribution module 242 may include instructions for execution on the processor 220 to sort the client operations 236, 237, 238 from the provisioning clients 228, 230 for sequential or synchronous processing at system elements 237 of the consumer services system 206. In some embodiments, the instructions of the module 242 may include inspecting a payload or header of each client operation (e.g., 236, 237, 238) for an identification or other value corresponding to a web-based account for services of the consumer services system 206 (e.g., consumer identifications 224A, 225A, 226A). Other instructions may include evenly or approximately evenly distributing each operation 236, 237, 238 to one of a first asynchronous queue 244 and a second asynchronous queue 246 such that all operations corresponding to a consumer account are distributed to a single queue. For example, the module 224 may include instructions to distribute each operation 236, 237, 238 according to the last digit of the consumer identification 225A, 226A for the account. In some embodiments, the module 242 may include instructions for execution on the processor 220 to distribute operations having an odd number for the last digit of the consumer identification (e.g., consumer identification 225A) to the first asynchronous queue 244 and operations having an even number for the last digit of the consumer identification (e.g., consumer identification 226A) to the second asynchronous queue 246.

The module 242 may also include instructions for execution on the processor 220 to send an interim notification indicating acceptance of the operation 236, 237, 238 to the corresponding provisioning client. The module 242 may also include instructions for execution on the processor 220 to send a final notification indicating completion of the operation 236, 237, 238 to the corresponding provisioning client. The module 242 may also include instructions for execution on the processor 220 to send a fail notification indicating failure or timeout of the operation 236, 237, 238 to the corresponding provisioning client.

Figure 3:
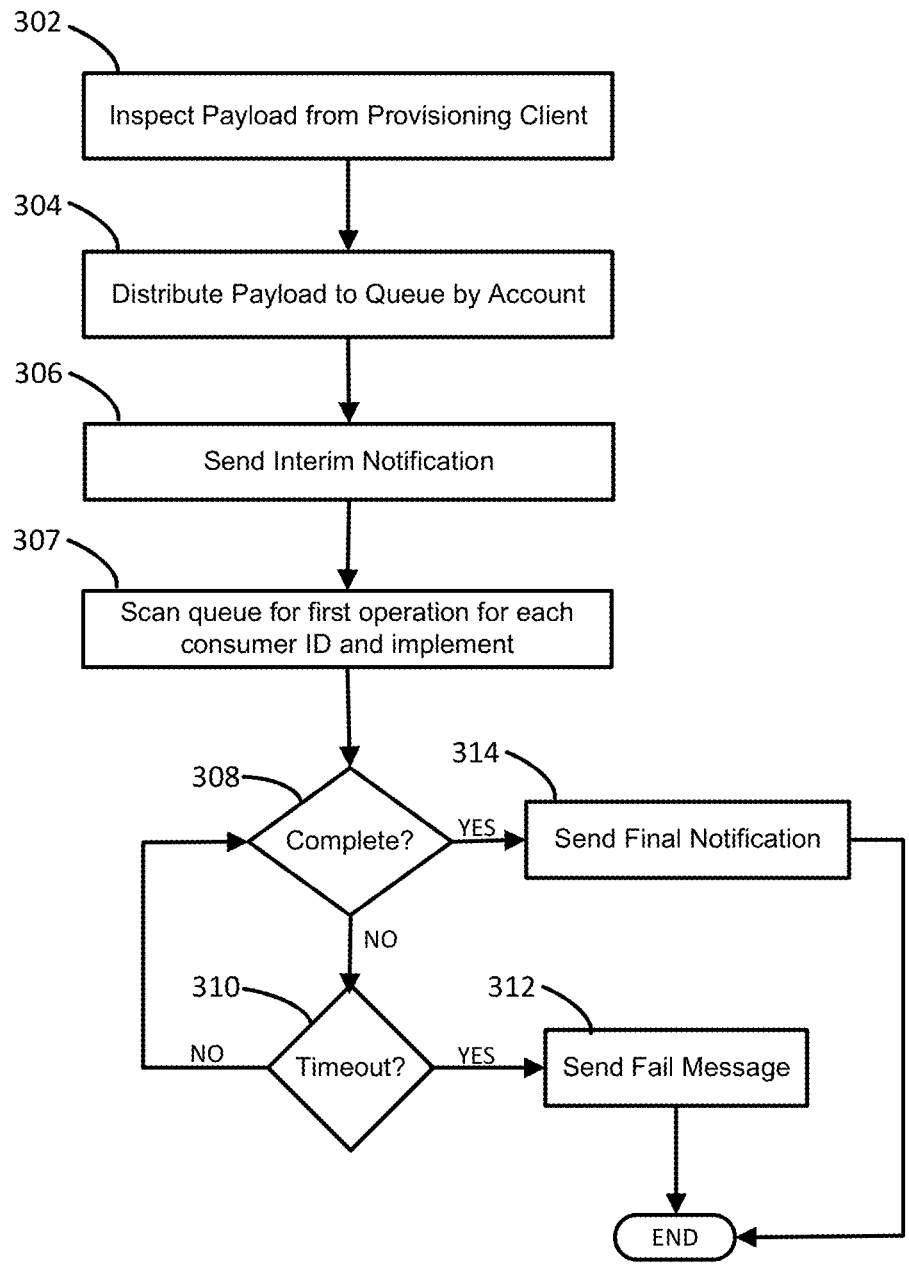
FIG. 3 is an illustration of a method for distributing asynchronous orders in accordance with the current disclosure.

FIG. 3 is a flowchart of a method 300 for distributing asynchronous operations in accordance with the current disclosure. Each step of the method 300 is one or more computer-executable instructions (e.g., modules, blocks, stand-alone instructions, etc.) performed on a processor of a server or other computing device (e.g., consumer computing system, consumer services system, or other computer system illustrated in FIG. 1 or FIG. 2 and/or described herein) which may be physically configured to execute the different aspects of the method. Each step may include execution of any of the instructions as described in relation to the system 100 as part of the sequential operation of distribution systems and methods described herein or other component that is internal or external to the system 100. While the below blocks are presented as an ordered set, the various steps described may be executed in any particular order to complete the methods described herein.

At block 302, the method 300 may cause a processor to execute instructions stored in a computer memory to inspect a client operation (236, 237, or 238) upon receipt from a client 228, 230. In some embodiments, the method 300 may cause a processor to execute instructions stored in a computer memory to inspect one or more portions of the client operation (e.g., 236, 237, 238) including an HTTP header, payload, or other aspects of the data sent from a client 228, 230. Inspection of the client operations (e.g., 236, 237, 238) may determine a consumer identification (e.g., 224A, 225A, or 226A) for each client operation. That consumer identification corresponds to both a consumer account data profile (e.g., 224, 225, 226) and the client operation 236, 237, or 238. The identification may include one or more numbers having an even or odd number as its last digit.

At block 304, the method 300 may cause a processor to execute instructions stored in a computer memory to evenly or approximately evenly distribute the client operation 224A, 225A, or 226C to one of two queues 244, 246. In some embodiments, the method 300 may distribute the operation according to whether the consumer identification corresponding to the operation (e.g., consumer identification 226A for operation 236 as shown in FIG. 2) ends in an even or odd number. For example, the method 300 may distribute client operations 236 and 237 corresponding to the consumer identification 226A to the second asynchronous queue 246 when the consumer identification 226A includes an even number as the last digit of the consumer identification 226A. Similarly, the method 300 may distribute client operation 238 corresponding to the consumer identification 225A to the first asynchronous queue 244 when the consumer identification 225A includes an odd number as the last digit of the consumer identification 225A.

At block 306, the method 300 may cause a processor to execute instructions stored in a computer memory to send an interim notification to each client 228, 230 upon receipt of the client operation corresponding to that client. The interim notification may indicate that one or more system elements 240 of the consumer services system 206 has accepted the client operation 236, 237, 238 for execution.

At block 307, the method 300 may cause a processor to execute instructions stored in a computer memory to scan each queue 244, 246 and to determine the first operation in the queue for each consumer identification and implement the operation. For example, as shown in FIG. 2, client operations 236 and 237 are both inserted into the second asynchronous queue 246. A timestamp 241 associated with client operation 236 may indicate when the client operation was requested by the consumer computer system 204 and that client operation 236 was received and/or must be executed before client operation 237. In other words, a timestamp for client operation 236 may be previous to the timestamp of client operation 237 and the remainder of the client operations that were evenly or approximately evenly distributed among the two asynchronous queues 244, 246. Thus, the method 300 may cause a processor to execute instructions stored in a computer memory to determine that client operation 236 must be executed before client operation 237, and then execute client operation 236 first.

At block 308, the method may cause a processor to execute instructions stored in a computer memory to determine if the client operation of block 307 is complete. If yes, then, at block 314, the method 300 may cause a processor to execute instructions stored in a computer memory to send a final notification to the client 228, 230. The final notification may indicate that the client operation has been executed and is complete. If no, then, at block 310, the method 300 may cause a processor to execute instructions stored in a computer memory to determine if a timeout threshold has been exceeded. For example, each client operation 236, 237, 238 may include a specified period of time that is allowed to elapse in the system 100 before the client operation is to be completed. If that period of time is exceeded, then the method 300 may proceed to block 312 and send a message to the client 228, 230 and/or the consumer computing system 204 indicating that a corresponding client operation has failed. If that period has not been exceeded, then the method may return to block 308 until either the client operation completes or the timeout value is exceeded and the operation fails.

Thus, the disclosure provides a technical solution to the technical problem of managing the distribution of traffic to software applications that ingest operations into an asynchronous queue when those operations are required to execute in a synchronous manner. An identifier may be retrieved from data corresponding to each client operation. A process distribution module may be placed in front of the two incompatible systems/applications to inspect each data payload and intelligently distribute the transactions to each instance based on a well-defined algorithm (e.g., even/odd, last digit, etc.). Synchronous execution may then occur according to a timestamp for each operation.

Figure 4:
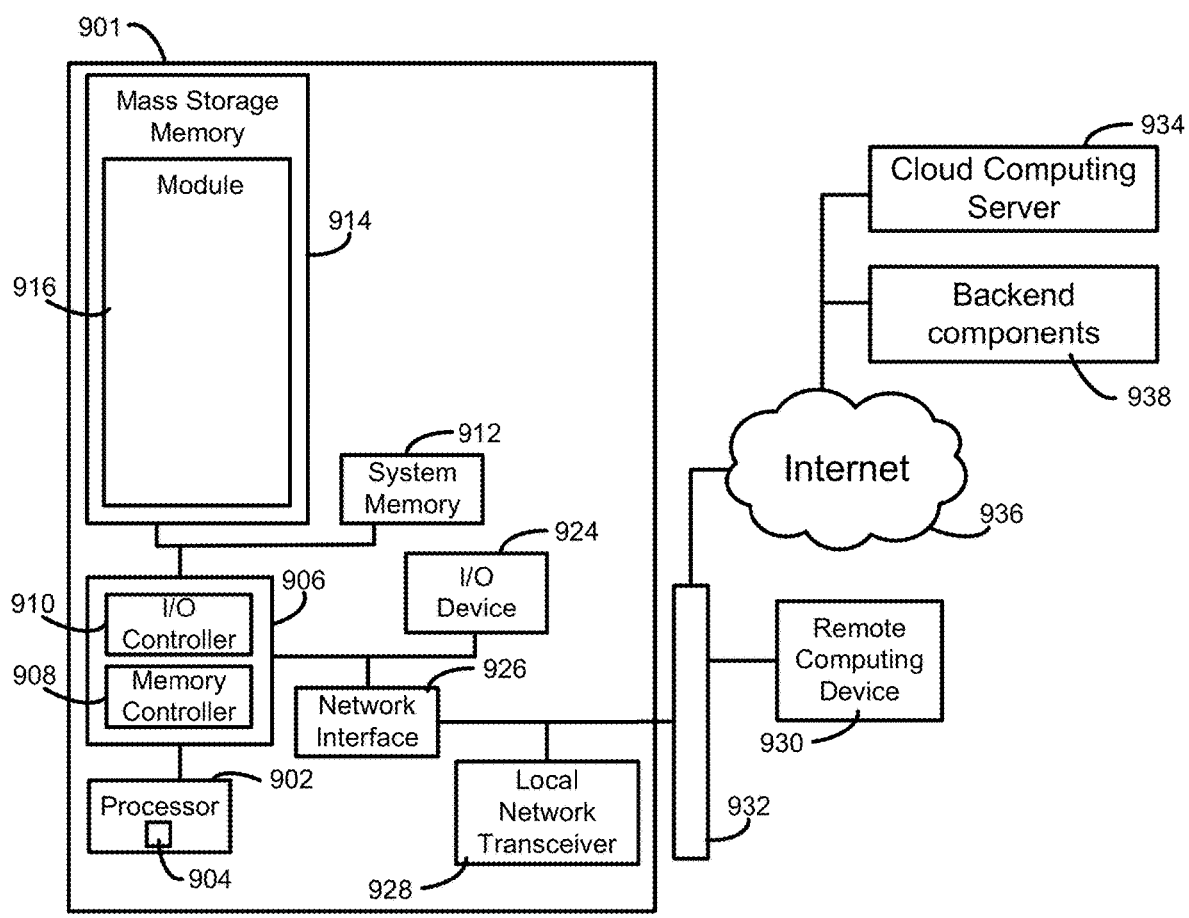
FIG. 4 is an illustration of an exemplary computing device for use with a system or method distributing asynchronous orders in accordance with the current disclosure.

FIG. 4 is a high-level block diagram of an example computing environment 900 for the system 100 and method (e.g., method 300) as described herein. The computing device 900 may include a server (e.g., the consumer services server 218, the clients 228, 230, the consumer computer system 204, etc.), or other known type of computing device.

Logically, the various servers may be designed and built to specifically execute certain tasks. For example, the consumer services server 218 may receive a large amount of data in a short period of time meaning the consumer services server may contain a special, high speed input output circuit to handle the large amount of data. In another example, the consumer computer system 204 may be under less computing strain than the consumer services server 218 and may have less processing power.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 4, the computing device 901 includes a processor 902 that is coupled to an interconnection bus. The processor 902 includes a register set or register space 904, which is depicted in FIG. 4 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 4, the computing device 901 may be a multi-processor device and, thus, may include one or more additional processors that are identical or similar to the processor 902 and that are communicatively coupled to the interconnection bus.

The processor 902 of FIG. 4 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 4 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 4 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for asynchronous distribution of operations that require synchronous execution, the system comprising:
 a processor; and
 a memory storing instructions that, when executed by the processor:
  receive client operations from a plurality of client computing systems, wherein each client operation of the client operations includes a consumer identification;
  distribute each of the client operations that include a consumer identification ending in an even number to a first asynchronous queue;
  distribute each of the client operations that include the consumer identification ending in an odd number to a second asynchronous queue; and
  execute a first client operation of the plurality of client operations within one of: the first asynchronous queue or the second asynchronous queue based at least in part on the consumer identification corresponding to the first client operation ending in the odd number or the even number;
 wherein each of the client operations includes a timestamp, and the timestamp of the first client operation is previous to timestamps of a remainder of the client operations.

2. The system of claim 1, further comprising instructions to determine the consumer identification for each of the client operations received from the plurality of client computing systems.

3. The system of claim 2, wherein the instructions that execute the first client operation of the client operations within the first and second asynchronous queues for the consumer identification corresponding to the first client operation include instructions that execute the first client operation of client operations within the first asynchronous queue and the second asynchronous queue for the consumer identification corresponding to the first client operation.

4. The system of claim 2, wherein the instructions to determine the consumer identification for each of a plurality of client operations received from the plurality of client computing systems includes instructions to inspect one or more of an HTTP header and a payload of each of the plurality of client operations.

5. The system of claim 1, wherein the consumer identification corresponds to both a consumer account data profile and at least one of the client operations.

6. The system of claim 1, further comprising instructions to send an interim notification to at least one client computing system upon receipt of a client operation.

7. The system of claim 6, wherein the interim notification indicates acceptance of the client operation for execution.

8. The system of claim 1, wherein each timestamp indicates when a consumer computing system of a plurality of consumer computing systems requested a client operation of the client operations corresponding to the timestamp.

9. The system of claim 1, further comprising instructions to send a final notification to each client of the plurality of client computing systems upon execution of the first client operation from each client of the plurality of client computing systems.

10. A computer-implemented method for asynchronous distribution of operations that require synchronous execution, the method comprising:

receiving of client operations from a plurality of client computing systems, wherein each client operation of the client operations includes a consumer identification;

distributing each of the client operations that include a consumer identification ending in an even number to a first asynchronous queue;

distributing each of the client operations that include the consumer identification ending in an odd number to a second asynchronous queue; and executing a first client operation of the client operations within one of: the first asynchronous queue or the second asynchronous queue based at least in part on the consumer identification corresponding to the first client operation ending in the odd number or the even number;

wherein each of the client operations includes a timestamp, and the timestamp of the first client operation is previous to timestamps of a remainder of the client operations.

11. The method of claim 10, further comprising:

determining the consumer identification for each of the client operations received from the client computing systems.

12. The method of claim 10, wherein executing the first client operation of the client operations within the first and second asynchronous queues for the consumer identification corresponding to the first client operation includes executing the first client operation of the client operations within the first asynchronous queue and the second asynchronous queue for the consumer identification corresponding to the first client operation.

13. The method of claim 10, wherein determining the consumer identification for each of a plurality of client operations received from the plurality of client computing systems includes inspecting one or more of an HTTP header and a payload of each of the plurality of client operations, and the consumer identification corresponds to both a consumer account data profile and at least one of the plurality of client operations.

14. The method of claim 10, further comprising:

sending an interim notification to each client of the client computing systems upon receipt of a client operation of the client operations from each client of the client computing systems;

wherein the interim notification indicates acceptance of the client operation for execution.

15. The method of claim 10, wherein each timestamp indicates when a consumer computing system of a plurality of consumer computing systems requested a client operation of the client operations corresponding to the timestamp.

16. The method of claim 10, further comprising sending a final notification to each client of the plurality of client computing systems upon execution of the first client operation from each client of the plurality of client computing systems.

17. A non-transitory computer-readable medium comprising computer-executable instructions for asynchronous distribution of operations that require synchronous execution, the instructions, when executed by a computer, cause the computer to perform:

receiving client operations from a plurality of client computing systems, wherein each client operation of the client operations includes a consumer identification;

distributing each of the client operations that include a consumer identification ending in an even number to a first asynchronous queue;

distributing each of the client operations that include the consumer identification ending in an odd number to a second asynchronous queue; and executing a first client operation of the client operations within one of: the first asynchronous queue or the second asynchronous queue based at least in part on the consumer identification corresponding to the first client operation ending in the odd number or the even number;

wherein each of the client operations includes a timestamp, and the timestamp of the first client operation is previous to timestamps of a remainder of the client operations.

18. The non-transitory computer-readable medium of claim 17, wherein:

determining the consumer identification for each of a plurality of client operations received from the plurality of client computing systems includes inspecting one or more of an HTTP header and a payload of each of the plurality of client operations; and the consumer identification is associated with a consumer account data profile and at least one of the plurality of client operations.

19. The non-transitory computer-readable medium of claim 17, further comprising instructions that, when executed by a computer, cause the computer to perform:

sending an interim notification to each client of the plurality of client computing systems upon receipt of a client operation of the plurality of client operations from each client of the plurality of client computing systems, wherein the interim notification indicates acceptance of the client operation for execution, and each timestamp indicates when a consumer computing system of a plurality of consumer computing systems requested a client operation of the client operations corresponding to the timestamp.

20. The non-transitory computer-readable medium of claim 17, further comprising instructions that, when executed by a computer, cause the computer to perform:

sending a final notification to each client of the plurality of client computing systems upon execution of the first client operation from each client of the plurality of client computing systems.

* * * * *